Nov. 21, 1950　　　C. J. VAN LOON　　　2,531,312
OSCILLATOR CIRCUIT ARRANGEMENT
Filed April 6, 1948
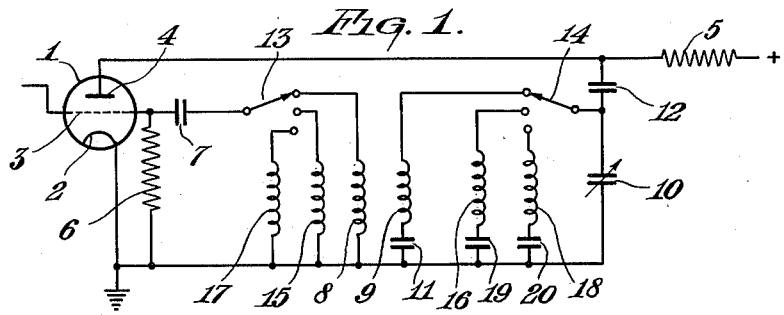
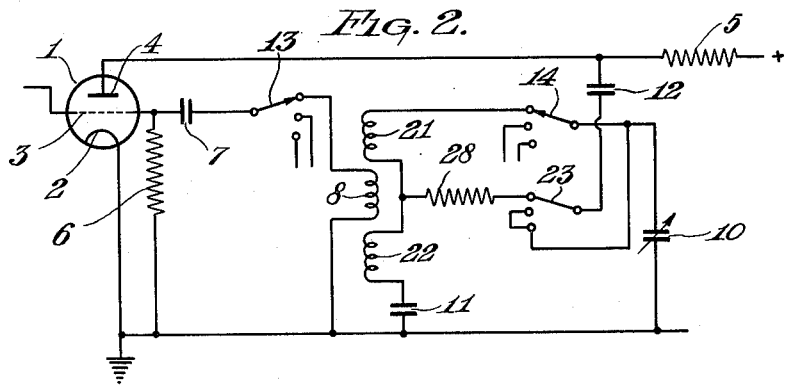
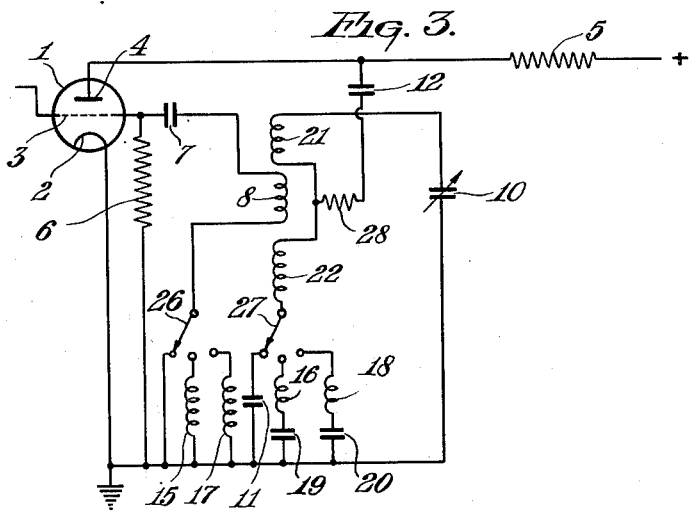
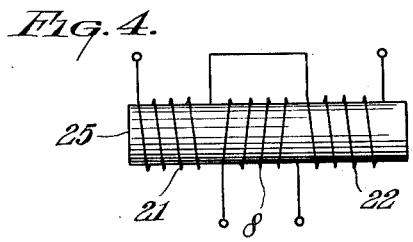
INVENTOR.
CAREL JAN VAN LOON
BY
ATTORNEY.

Patented Nov. 21, 1950

2,531,312

UNITED STATES PATENT OFFICE 2,531,312

OSCILLATOR CIRCUIT ARRANGEMENT

Carel Jan van Loon, Eindhoven, Netherlands, assignor to Hartford National Bank and Trust Company, Hartford, Conn., as trustee Application April 6, 1948, Serial No. 19,244
In the Netherlands April 9, 1947

5 Claims. (Cl. 250—36)

The invention relates to oscillator circuit-arrangements designed, more particularly, for superheterodyne receiving-apparatus and comprising a positively back-coupled discharge tube, wherein the feedback path extends over a tap on the inductance coil of the frequency-determining circuit tunable by means of a variable condenser, and a second inductance coil which is inductively coupled to the first-mentioned coil.

The invention has for its object to minimise in such a circuit-arrangement as far as possible the influence exerted by variations in temperature on the oscillator frequency.

The invention will be described with reference to the appended drawing in which:

Figure 1 is a schematic diagram showing one usual form of oscillator circuit,

Figure 2 is a schematic diagram showing one form of circuit arrangement in accordance with the invention, Figure 3 is a schematic diagram showing another form of circuit arrangement in accordance with the invention, and Figure 4 illustrates the construction of the feedback coil of the circuit of Fig. 2.

A usually employed circuit-arrangement is shown in Fig. 1 of the accompanying drawing, in which 1 denotes an oscillating discharge tube (shown here as a triode) comprising a cathode 2, a grid 3 and an anode 4, the latter being connected through a resistance 5 to the positive terminal of a source of supply current the negative terminal of which may be earthed. The grid 3 is connected through a grid leakage resistance 6 to the cathode 2 and to earth and, moreover, through a condenser 7 and the movable arm of a switch 13 to the upper end of a coil 8 the lower end of which is connected to the cathode. This coil 8 is inductively coupled to a coil 9 which forms part of the frequency-determining circuit of the oscillator, which circuit may be tuned by means of a variable condenser 10. This condenser 10 is connected via a movable arm 14 to the upper end of the coil 9. An invariable adjusting condenser 11 is connected between the coil 9 and earth, this series-connection being connected in parallel with the condenser 10 one electrode of which is earthed. The condenser 11 is a so-called "padding condenser" which serves to obtain between the tuning frequency of the circuit 9, 10, 11 and the tuning frequency of a preceding high-frequency circuit (not shown in the drawing) a frequency which is substantially constant over the whole of the tuning range.

The desired feedback between the anode circuit and the grid circuit of the tube furthermore takes place through the invariable condenser 12 connected between the anode 4 and the upper end of the coil 9. It is thus possible to produce oscillations the frequency of which is variable by adjustment of the position of the tuning condenser 10.

The switch arms 13 and 14 are coupled to one another; by changing-over it is possible to receive in another frequency-range since then the coils 8 and 9 and the condenser 11 are replaced by coils 15 and 16 and a condenser 19 or by coils 17 and 18 and a condenser 20 respectively. The coils 17 and 18 as well as the coils 15 and 16 are coupled to one another. Let us assume, for example, that the coils 8 and 9 and the condenser 11 are in circuit if it is desired to tune in the short-wave range and that the elements 15, 16, 19 and 17, 18, 20 serve for the reception in the medium-wave or long-wave range respectively.

This known circuit-arrangement entails the disadvantage that, more particularly in shortwave reception, the frequency produced is greatly dependent upon temperature, which disadvantage naturally is most troublesome in the case of apparatus of reduced dimensions wherein during operation the temperature may reach a fairly high value. This phenomenon is primarily due to the fact that the various stray capacities of the circuit-arrangement vary rather strongly with temperature. Among these stray capacities it is more particularly the capacities in the tube holder, those between the different supply wires leading to the electrodes of the tube, the capacities between the live parts of the wavelength-switch and the capacity between the feedback coil and the tuning coil which are of importance.

The influence exerted by the capacities of the tube holder, by those present in the base of the tube and by the capacity of the wiring may substantially be eliminated, or at least greatly reduced, if provision is made that the feedback path passes through a tap on the inductance coil of the tunable circuit, for example by connecting the condenser 12 of Fig. 1 between the anode 4 and a tap on the coil 9. With this circuit-arrangement, even without taking this step, the grid-cathode capacity exerts on the tuning of the circuit 9, 10, 11 only a slight influence since this capacity is coupled to the said circuit rather loosely and the capacity, reduced to the circuit, is therefore small. However, owing to the above-mentioned step also the influence of the variation in anode-cathode capacity has greatly diminished since the coupling of this capacity to the circuit 9, 10, 11 is greatly reduced.

If, conversely, the tuned circuit is connected between grid and earth, the influence of a variation in grid-cathode capacity, on the contrary, predominates over the influence exerted by a variation in the anode-cathode capacity on the tuning of the circuit 9, 10, 11. In this case the grid 3 must be connected through a coupling condenser 7 to a tap on the coil of the tunable circuit, which results in a great reduction of the influence exerted on the tuning by the grid-cathode capacity.

The above-mentioned step consequently permits of greatly reducing the influence exerted by a variation in the tube-holder capacity and in any capacity present in the tube-base, due to variation in temperature, on the tuning of the circuit 9, 10, 11. The said step is, however, far from effective since the influence of other capacities likewise highly dependent upon temperature subsists. Moreover, just with the coil destined for the short-wave range the said measure can be carried out with difficulty only, for in order to obtain a satisfactory oscillator effect for all the frequencies of this range it is necessary to couple the coils through which the inductive coupling takes place, comparatively intensely. It is customary for this purpose to wind the coil of the tuned circuit, which coil consists for the short-wave range of comparatively thick wire, on an insulating core and with a certain intervening space between the turns and to provide the turns of the second coil, which consists of thinner wire, between the turns of the first-mentioned coil. In this case it is comparatively difficult to provide a tap on the said coil of thick wire. Moreover, the capacity between these coils is comparatively large and, due to the presence of the core of dielectric material, it varies comparatively strongly with temperature, so that when the apparatus gets warm after being switched-on again a rather great frequency shift may be produced.

According to the invention, in order to obviate these disadvantages the inductance coil is divided into two spatially separated parts connected in series, the junction point of these parts constituting the above-mentioned tap. These two parts are inductively coupled to the second coil which is spatially arranged between the said two parts. It has now been found that thus a quite satisfactory back-coupling for the short-wave range may be obtained and, moreover, that the said frequency shift is greatly reduced. The tap may be provided in a very easy manner since the one part of the coil of the tuned circuit, the retroaction coil and the other part of the coil of the tuned circuit may successively be wound on the same core, whereupon the adjacent ends of the said parts are connected to one another, the junction forming the above-mentioned tap.

One embodiment of the invention is represented in Fig. 2 of the accompanying drawing, in which elements similar to those of the circuit-arrangement shown in Fig. 1 are denoted by the same references. For the sake of simplicity the elements serving for the reception in the medium-wave and long-wave ranges are omitted.

The circuit-arrangement according to Fig. 2 differs from that according to Fig. 1 in that the coil 9 is subdivided into two parts 21 and 22 each of which is inductively coupled to the feedback coil 8 and which preferably are also coupled to one another, the coil 8 being spatially arranged between the two parts 21 and 22. The connecting wire between the parts 21 and 22, which wire is taken to the outside, is connected through a switch 23 and a condenser 12 to the anode 4, so that in the short-wave range back-coupling is effected via a tap on the coil of the tunable circuit. The resistance 28 serves to counteract the production of parasitic oscillations. The switch 23 is coupled with the wavelength switches 13 and 14 and is constructed in such manner that in the case of reception in the medium- or long-wave range the anode is connected through the condenser 12 to the upper ends of the coils switched into circuit in the case of reception in these ranges.

Fig. 4 represents a coupling element according to the invention. The windings 21, 8 and 22 are wound on a core 25 of insulating material, the winding 8 being provided in between the windings 21 and 22. A proper choice of the dimensions of the windings permits to obtain a satisfactory coupling between the winding 8 on the one hand and the windings 21 and 22 on the other hand, and yet the capacity between the windings is only small and variation of this capacity due to variation of temperature has therefore only little influence on the tuning of the oscillator circuit. The coil parts 21 and 22 may have, for example, a length of 5 mms. and the coil 8 a length of 2 mms. whilst the diameter may be about 10 mms. and the spacing between the winding 8 and the winding 21 or 22 may be 1 mm. Each winding may have in this case 8 turns. It is evident, however, that other values may also be taken.

With the circuit-arrangement according to Fig. 2 the influence of the stray capacity existing between the conductive parts of the wave-length switch may still play a comparatively important part. With circuit-arrangements according to Figs. 1 and 2 this influence might be reduced by providing the switches 13 and 14 at the lower ends of the coils instead of at the upper ends thereof, so that in the case of reception in the short-wave range the conductive parts are substantially at zero potential and variation in the value of the dielectric constants due to a variation in temperature no longer influences the tuning of the circuit 9, 10, 11 in this range. Applied to the known circuit-arrangement this measure involves, however, difficulties, the principal one being that the capacity between the coils 8 and 9 is very troublesome in the case of reception in the medium- or long-wave range. In carrying out the present invention this disadvantage does not occur since then the said capacity has a very low value. When carrying out the invention it is consequently possible without any objection, in the case of reception in the medium- or long-wave range, to connect the inductance to be used for these ranges in series with the inductance 21, 22 by means of the wavelength switch located on that side of the latter inductance which is earthed in the case of reception in the short-wave range, such a circuit-arrangement is shown in Fig. 3.

Elements of the circuit-arrangement according to Fig. 3 which are identical to those of the circuit-arrangement according to Figs. 1 and 2 are denoted by the same references. The circuit-arrangement according to Fig. 3 differs from that shown in Fig. 2 in that here the wavelength switch, which has inter alia two mutually coupled arms 26 and 27, is provided in such manner that with the reception of frequencies in the short-wave range, when consequently the arms occupy the position shown in Fig. 3, it has approximately earth potential owing to the comparatively high value of the condenser 11. Variation in the capacity between the conductive parts of this switch, due to variation in temperature, consequently no longer influences the frequency of the oscillator circuit. When changing-over to another range, for example, to the medium-wave range, a coil 17 is connected in series with the coil 8 and an inductance 16 and a padding condenser 19 are connected in series with the parts 21 and 22 of the coil of the tunable oscillator circuit. The coils 15 and 16 are coupled to one another in such manner that oscillations are generated in the circuit 21, 22, 16, 19, 10. The capacity between the coil 8 on one hand and the parts 21, 22 of the coil of the oscillator circuit on the other hand is low and has no harmful effect. Like in Fig. 1 the mutually coupled coils 17 and 18 and the condenser 20 are switched into circuit in the case of reception in the long-wave range.

What I claim is:

1. An oscillator circuit arrangement comprising an electron discharge tube having input and output electrodes, resonance circuit means comprising a first inductor element and a capacitance element, said first inductor element comprising first and second windings connected in series and spaced apart, a second inductor element interposed between said first and second windings and inductively coupled thereto, means to couple one of said electrodes to the junction of said first and second windings, and means to couple the other of said electrodes to said second inductor element in feedback relationship.

2. An oscillator circuit arrangement comprising an electron discharge tube having input and output electrodes, resonance circuit means comprising a first inductor element and a capacitance element, said first inductor element comprising first and second windings connected in series and spaced apart, a second inductor element interposed between said first and second windings and inductively coupled thereto, a capacitor interconnecting the said output electrode to the junction of said first and second windings, and means to couple the said input electrode to said second inductor element in feedback relationship.

3. An oscillator circuit arrangement comprising an electron discharge tube having input and output electrodes, resonance circuit means comprising a capacitance element, a plurality of first inductors including a first inductor element and means to connect said capacitance element to said inductors selectively, said first inductor element comprising first and second windings connected in series and spaced apart, a plurality of second inductors including a second inductor element, said second inductor element being interposed between said first and second windings and being inductively coupled thereto, means to couple one of said electrodes to said first inductors and to the junction of said first and second windings selectively, and means to selectively couple the other of said electrodes to said second inductors in feedback relationship.

4. An oscillator circuit arrangement comprising an electron discharge tube having input and output electrodes, resonance circuit means comprising a first inductor element, and a capacitance element, a second inductor element, means to connect said second inductor element in series with said first inductor element and said capacitance element, said first inductor element comprising first and second windings connected in series and spaced apart, a third inductor element interposed between said first and second windings and inductively coupled thereto, a fourth inductor element inductively coupled to said second inductor element, means to connect said fourth inductor element in series with said third inductor element, means to couple one of said electrodes to the junction of said first and second windings, and means to couple the other of said electrodes to said third inductor element in feedback relationship.

5. An oscillator circuit arrangement comprising an electron discharge tube having input and output electrodes, resonance circuit means comprising a first inductor element and a capacitance element, said first inductor element comprising an insulating core and first and second coaxial windings connected in series and spaced apart on said core, a second inductor element coaxially wound on said core and interposed between said first and second windings and inductively coupled thereto, means to couple one of said electrodes to the junction of said first and second windings, and means to couple the other of said electrodes to said second inductor element in feedback relationship.

CAREL JAN van LOON.

REFERENCES CITED

The following references are of record in the file of this patent:

UNITED STATES PATENTS

| Number | Name | Date |
|---|---|---|
| 1,931,338 | Wheeler | Oct. 17, 1933 |
| 2,036,319 | Case | Apr. 17, 1936 |

FOREIGN PATENTS

| Number | Country | Date |
|---|---|---|
| 559,477 | France | June 15, 1923 |

Certificate of Correction

Patent No. 2,531,312                                              November 21, 1950

CAREL JAN van LOON

It is hereby certified that error appears in the printed specification of the above numbered patent requiring correction as follows:

Column 1, line 53, before the word "frequency" insert *difference*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*